(12) United States Patent
Nishigaki

(10) Patent No.: US 8,924,121 B2
(45) Date of Patent: Dec. 30, 2014

(54) VEHICLE CONTROLLER

(75) Inventor: Takahiro Nishigaki, Ueda (JP)

(73) Assignee: Nissin Kogyo Co., Ltd, Nagano (JP)

( * ) Notice: Subject to any disclaimer, the term of this patent is extended or adjusted under 35 U.S.C. 154(b) by 587 days.

(21) Appl. No.: 13/213,490

(22) Filed: Aug. 19, 2011

(65) Prior Publication Data

US 2012/0046805 A1 Feb. 23, 2012

(30) Foreign Application Priority Data

Aug. 23, 2010 (JP) ................. 2010-185889

(51) Int. Cl.
*B60T 8/24* (2006.01)
*G06G 1/00* (2006.01)
*G06F 7/70* (2006.01)
*G01M 17/00* (2006.01)
*G06F 7/00* (2006.01)
*G06F 19/00* (2011.01)
*B60T 8/1755* (2006.01)

(52) U.S. Cl.
CPC ......... *B60T 8/17551* (2013.01); *B60T 2250/06* (2013.01); *B60T 2270/86* (2013.01)
USPC .......... 701/72; 701/30.3; 701/31.1; 701/31.3; 701/70

(58) Field of Classification Search
CPC . B60T 8/885; B60T 8/1755; B60T 2270/413; B60T 2270/86; B60T 2230/02; B60T 2250/03; B60T 8/172; B62D 15/024; B60R 16/0231; G07C 5/008; G01C 21/28
USPC .................. 701/1, 36–39, 41–43, 70–72, 93, 701/29.1–29.7, 31.3; 180/197; 280/5.5–5.508; 340/438, 967
See application file for complete search history.

(56) References Cited

U.S. PATENT DOCUMENTS 5,893,896 A * 4/1999 Imamura et al. ................. 701/70
6,024,187 A * 2/2000 Takeda et al. .................. 180/408
6,259,973 B1 7/2001 Ehret et al.
(Continued)

FOREIGN PATENT DOCUMENTS

DE 19615311 A1 10/1997
JP 2004506572 A 3/2004

OTHER PUBLICATIONS

European Search Report for Appl. No. EP 11178415.3, dated Nov. 11, 2011.

*Primary Examiner* — Khoi Tran
*Assistant Examiner* — Abby Lin
(74) *Attorney, Agent, or Firm* — Andrew M. Calderon; Robert Mlotkowski Safran & Cole, P.C.

(57) ABSTRACT

According to one embodiment, there is provided a vehicle controller including: a sudden change judgment section that judges whether a change rate of a detected yaw rate is equal to or more than a predetermined value; a normative yaw rate calculator that calculates a normative yaw rate based on a steering angle amount; and a correction section that performs a correction for making a detected lateral acceleration close to a value to be detected at a gravity center of a vehicle, by using: the detected yaw rate when the sudden change judgment section judges that the change rate of the detected yaw rate is less than the predetermined value; and the normative yaw rate instead of the detected yaw rate when the sudden change judgment section judges that the change rate of the detected yaw rate is equal to or more than the predetermined value.

19 Claims, 6 Drawing Sheets

(56) References Cited

U.S. PATENT DOCUMENTS

| | | |
|---|---|---|
| 2004/0102888 A1 | 5/2004 | Burgdorf et al. |
| 2006/0025910 A1* | 2/2006 | Hayashi ............ 701/34 |
| 2007/0106444 A1 | 5/2007 | Asano |
| 2012/0041644 A1* | 2/2012 | Turner ............ 701/41 |

* cited by examiner

VEHICLE CONTROLLER

CROSS-REFERENCE TO RELATED APPLICATION(S)

This application claims priority from Japanese Patent Application No. 2010-185889 filed on Aug. 23, 2010, the entire contents of which are incorporated herein by reference.

FIELD

The present invention relates to a vehicle controller for estimating lateral acceleration based on the detected yaw rate detected by a yaw rate sensor.

BACKGROUND

There is proposed a vehicle controller for performing the behavior control of a vehicle using signals from a yaw rate sensor and a lateral acceleration sensor. For example, JP-2004-506572-A discloses a vehicle controller incorporating a yaw rate sensor and a lateral acceleration sensor. Such vehicle controller is usually disposed inside the engine room on the front side of the vehicle. That is, such vehicle controller is disposed at a position different from the gravity center of the vehicle. Thus, the respective sensors that are integrally provided on the vehicle controller are also disposed at positions different from the gravity center of the vehicle.

When the lateral acceleration sensor is provided at a position different from the gravity center of the vehicle, it is necessary to correct the detected lateral acceleration to be close to the value to be detected at the gravity center of the vehicle. As such correction, it is known that the detected lateral acceleration is corrected using the detected yaw rate detected by the yaw rate sensor that is not affected by its disposition.

However, when correcting the detected lateral acceleration using the detected yaw rate, the detected yaw rate may changes suddenly due to the abnormality of the yaw rate sensor, for example. In this case, the correction of the detected lateral acceleration is significantly affected.

SUMMARY

One object of the present invention is to provide a vehicle controller capable of appropriately correcting detected lateral acceleration without being affected by the sudden change of a detected yaw rate.

According to one aspect of the present invention, there is provided a vehicle controller including: a sudden change judgment section that judges whether a change rate of a detected yaw rate detected by a yaw rate sensor is equal to or more than a predetermined value; a normative yaw rate calculator that calculates a normative yaw rate based on a steering angle amount detected by a steering angle sensor; and a correction section that performs a correction for making a detected lateral acceleration detected by a lateral acceleration sensor close to a value to be detected at a gravity center of a vehicle, the lateral acceleration sensor being positioned not at the gravity center, the correction being performed by using: the detected yaw rate when the sudden change judgment section judges that the change rate of the detected yaw rate is less than the predetermined value; and the normative yaw rate instead of the detected yaw rate when the sudden change judgment section judges that the change rate of the detected yaw rate is equal to or more than the predetermined value.

The "predetermined value" is herein a reference value for a judgment as to whether a sudden change, such as an abnormality, has occurred. The predetermined value can be set appropriately through experiments, simulations, etc. suited for the vehicle on which the vehicle controller is mounted.

According to the above configuration, when the change rate of the detected yaw rate is equal to or more than the predetermined value, the detected lateral acceleration is corrected using the normative yaw rate. Hence, even when the detected yaw rate changes suddenly, the detected lateral acceleration can be corrected appropriately without being affected by this sudden change. Furthermore, when the change rate of the detected yaw rate is less than the predetermined value, the detected lateral acceleration can be corrected accurately based on the measurement value (the detected yaw rate) of the yaw rate sensor. In other words, both the accurate correction and a fail-safe state free from the influence caused due to the abnormality of the yaw rate sensor can be accomplished in the present invention by virtue of the switching of the control using a simple method.

The vehicle controller, further including: a vehicle speed calculator that calculates the vehicle speed based on a parameter relating to the vehicle speed, wherein the normative yaw rate calculator calculates the normative yaw rate based on the steering angle amount and the vehicle speed.

The "parameter relating to the vehicle speed" is herein a parameter that is used to obtain the vehicle speed, for example, the wheel speed detected by a wheel speed sensor or the forward/backward movement acceleration detected by forward/backward movement acceleration sensors.

According to the above configuration, since the normative yaw rate is calculated from the steering angle amount and the vehicle speed, the normative yaw rate can be made closer to the measurement value (the detected yaw rate), and the correction at the time when the yaw rate sensor is abnormal can be performed more accurately.

There may be provided the vehicle controller, wherein the correction section performs the correction using the normative yaw rate only during a predetermined time and resumes the correction using the detected yaw rate after the predetermined time is elapsed, the predetermined time corresponding to a changing time of the detected yaw rate.

The "predetermined time" is herein the time corresponding to the change time elapsed until the detected yaw rate (including a value subjected to filter processing) becomes approximately constant after the sudden change of the detected yaw rate. The predetermined time can be set appropriately through experiments, simulations, etc.

According to the above configuration, since the normative yaw rate is used only in a period in which the correction value is most affected by the sudden change of the detected yaw rate, the lateral acceleration can be corrected so as not to be affected by the sudden change as much as possible. Moreover, when the sudden change of the output value of the yaw rate sensor is merely temporarily, accurate correction can be performed by using the detected yaw rate again.

There may be provided the vehicle controller, further including: an unstability judgment section that judges that a traveling state of the vehicle is unstable when a unstable level is more than a threshold value, the unstable level indicating an unstableness of the traveling state of the vehicle, wherein the correction section performs the correction using the normative yaw rate only when the unstability judgment section does not judge the traveling state of the vehicle to be unstable.

According to the above configuration, since the normative yaw rate is used only when the traveling state of the vehicle is not unstable, the correction using the normative yaw rate can be performed accurately.

There may be provided the vehicle controller, wherein the unstability judgment section makes the judgment by using at least the detected yaw rate and the steering angle amount immediately before when the change rate of the detected yaw rate becomes equal to or more than the predetermined value.

According to the above configuration, since the unstability judgment section makes the judgment using the detected yaw rate and the steering angle amount immediately before the sudden change of the detected yaw rate, the judgment section can accurately judge the traveling state (the unstable level) of the vehicle immediately before the yaw rate sensor is suspected as being abnormal.

There may be provided the vehicle controller, wherein the vehicle controller is capable of performing a vehicle behavior control to suppress a behavior of the vehicle using the detected lateral acceleration subjected to the correction by the correction section.

According to the above configuration, even when the detected yaw rate changes suddenly due to the abnormality of the yaw rate sensor, the behavior of the vehicle can be suppressed properly by correcting the detected lateral acceleration based on the normative yaw rate. In addition, when the change of the detected yaw rate is small, the detected lateral acceleration is accurately corrected using the measurement value (the detected yaw rate) of the yaw rate sensor. Hence, the behavior of the vehicle can be suppressed properly based on the accurate correction value.

According to the present invention, the detected lateral acceleration can be corrected appropriately without being affected by the sudden change of the detected yaw rate.

DETAILED DESCRIPTION

An embodiment will be described in detail referring to the accompanying drawings.

Figure 1:
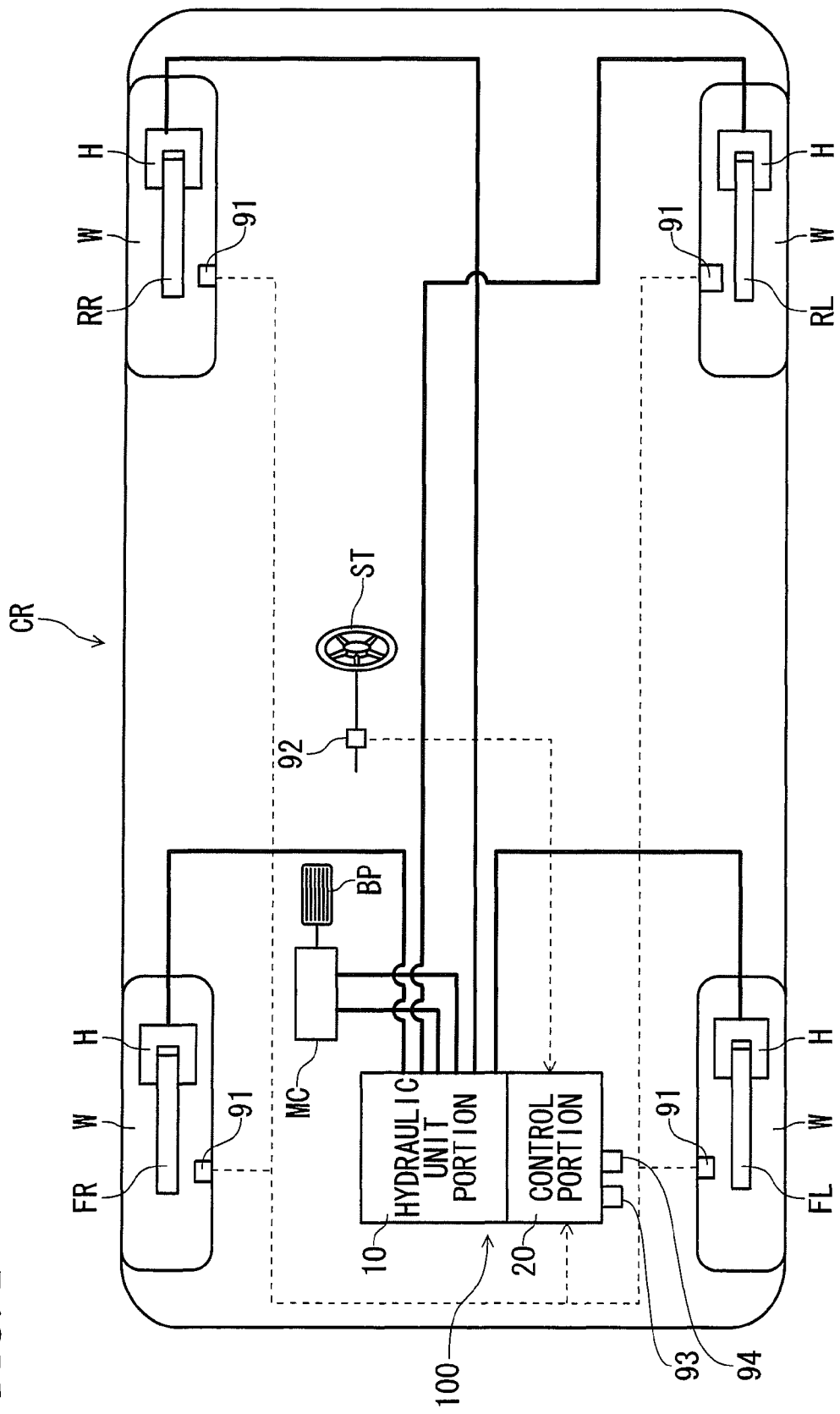
FIG. 1 illustrates a vehicle having a vehicle controller.

As shown in FIG. 1, a vehicle CR has wheels W. A vehicle controller 100 is provided in the vehicle CR to control a braking force (brake fluid pressure) applied to each wheel W. The vehicle controller 100 is installed inside the engine room at a position forwardly of the gravity center of the vehicle. The vehicle controller 100 includes a hydraulic unit portion 10 and a control portion 20. The hydraulic unit portion 10 has fluid passages (hydraulic passages) and various components. And, the control portion 20 controls the components provided in the hydraulic unit portion 10.

For example, the control portion 20 includes CPU, a RAM, a ROM and input/output circuits, and performs control by performing various arithmetic processing based on the input from a wheel speed sensor 91, a steering angle sensor 92, a lateral acceleration sensor 93 and a yaw rate sensor 94 and based on programs and data stored in the ROM.

The wheel speed sensor 91 is provided for each wheel W to detect the speed of each wheel W.

The steering angle sensor 92 is provided for the rotation shaft of the steering wheel ST to detect the steering angle amount of the steering wheel ST.

The lateral acceleration sensor 93 is integrally provided on the control portion 20 to detect acceleration (lateral acceleration) in the lateral direction of the vehicle CR.

The yaw rate sensor 94 is integrally provided on the control portion 20 to detect the turning angular velocity (detected yaw rate) of the vehicle CR.

Since the lateral acceleration sensor 93 and the yaw rate sensor 94 are integrally provided on the control portion 20, positions thereof are different from the position of the gravity center of the vehicle. This disposition does not affect the detection value of the yaw rate sensor 94 but affects the detection value of the lateral acceleration sensor 93.

Hence, the control portion 20 performs correction so that the detection value (detected lateral acceleration) of the lateral acceleration sensor 93 is made close to a value to be detected at the gravity center, based on the detection value (detected yaw rate) of the yaw rate sensor 94. This correction will be described later in detail.

Each of wheel cylinders H is a hydraulic device for converting the brake fluid pressure generated by a master cylinder MC and the vehicle controller 100 into the actuating force of each wheel brake FR/FL/RR/RL provided for each wheel W. The wheel cylinders H are respectively connected to the hydraulic unit portion 10 via pipes.

Figure 2:
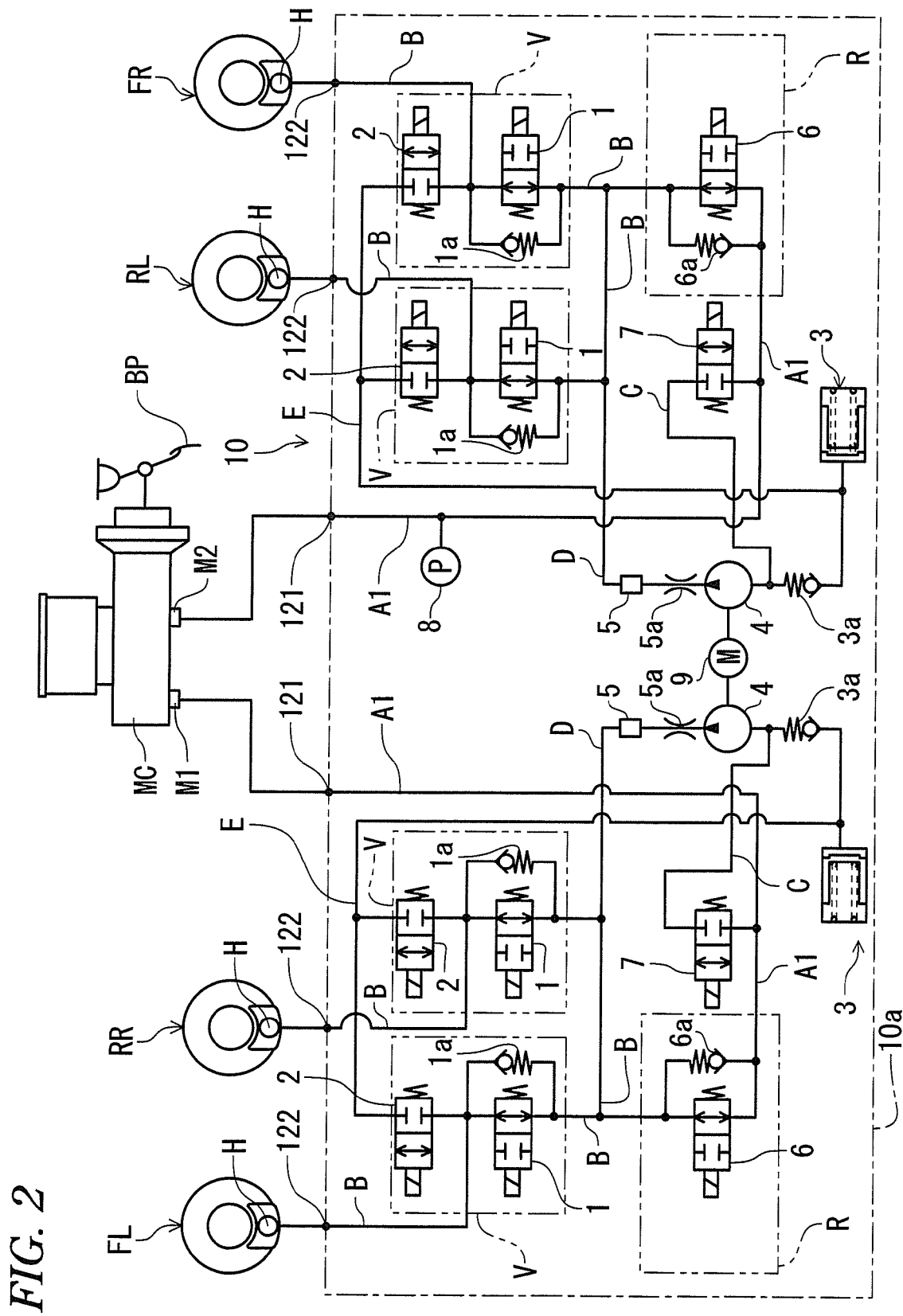
FIG. 2 illustrates brake hydraulic circuit of the vehicle controller.

As shown in FIG. 2, the hydraulic unit portion 10 is disposed between the master cylinder MC and the wheel brakes FR, FL, RR and RL. The hydraulic unit portion 10 serves as a fluid pressure source for generating brake fluid pressure depending on the driver's depressing force applied to the brake pedal BP. The hydraulic unit portion 10 includes a pump body 10a serving as a base body having fluid passages through which brake fluid flows, plural inlet valves 1 and plural outlet valves 2 disposed in the fluid passages, etc.

The two output ports M1 and M2 of the master cylinder MC are connected to the inlet ports 121 of the pump body 10a, and the outlet ports 122 of the pump body 10a are respectively connected to the wheel brakes FR, FL, RR and RL. In the usual state, the inlet ports 121 and the outlet ports 122 are communicated via the fluid passages inside the pump body 10a, and the depressing force applied to the brake pedal BP is transmitted to each wheel brake FL/RR/RL/FR.

The fluid passage from the output port M1 leads to the front left wheel brake FL and the rear right wheel brake RR, and the fluid passage from the output port M2 leads to the front right wheel brake FR and the rear left wheel brake RL. In the following description, the fluid passage starting from the output port M1 is referred to as a "first system", and the fluid passage starting from the output port M2 is referred to as a "second system."

In the hydraulic unit portion 10, the first system includes two control valve unit V respectively corresponding to the wheel brakes FL and RR, and the second system includes two control valve unit V respectively corresponding to the wheel brakes RL and FR. In the hydraulic unit portion 10, a reservoir 3, a pump 4, a damper 5, an orifice 5, a regulator valve unit (regulator) R and a suction valve 7 are provided in each of the first and second systems. Further, a common motor 9 is provided for driving the both pumps 4, 4 of the first and second systems. The rotation speed of the motor 9 is controllable. Still further, a pressure sensor 8 is provided only for the second system, in the embodiment.

In the following description, the fluid passage from the output port M1 of the master cylinder MC to the regulator valve unit R and the fluid passage from the output port M2 thereof to the regulator valve unit R are each referred to as an "output hydraulic passage A1." The fluid passage from the regulator valve unit R of the first system to the wheel brakes FL and RR and the fluid passage from the regulator valve unit R of the second system to the wheel brakes RL and FR are each referred to as a "wheel hydraulic passage B." Furthermore, the fluid passage from the output hydraulic passage A1 to the pump 4 is referred to as a "suction hydraulic passage C" and the fluid passage from the pump 4 to the wheel hydraulic passage B is referred to as a "discharge hydraulic passage D." Moreover, the fluid passage from the wheel hydraulic passage B to the suction hydraulic passage C is referred to as an "open passage E."

The control valve unit V controls the transmission of the fluid pressure between the master cylinder MC or the pump 4 and each wheel brake FL/RR/RL/FR to thereby increase/retain/decrease the pressure of the wheel cylinder H. The control valve unit V includes an inlet valve 1, an outlet valve 2 and a check valve 1a.

The inlet valve 1 is a normally-open solenoid valve provided between the master cylinder MC and each wheel brake FL/RR/RL/FR, that is, in the wheel hydraulic passage B. Since the inlet valve 1 is normally opened, the brake fluid pressure is allowed to be transmitted from the master cylinder MC to each wheel brake FL/RR/RL/FR. When the wheel W is likely to lock, the inlet valve 1 is closed by the control portion 20 to shut off the transmission of the brake fluid pressure from the brake pedal BP to each wheel brake FL/RR/RL/FR.

The outlet valve 2 is a normally-closed solenoid valve provided between each reservoir 3 and each wheel brake FL/RR/RL/FR, that is, between the wheel hydraulic passage B and the open passage E. The outlet valve 2 is normally closed. And, when the wheel W is likely to lock, the outlet valve 2 is opened by the control portion 20 to relieve the brake fluid pressure applied to each wheel brake FL/RR/RL/FR to each reservoir 3.

The check valve 1a is a one-way valve provided in parallel with each inlet valve 1. The check valve 1a allows the brake fluid to flow only from each wheel brake FL/RR/RL/FR to the master cylinder MC. For example, even when the input from the brake pedal BP is released while the inlet valve 1 is closed, the check valve 1a allows the brake fluid to flow from each wheel brake FL/RR/RL/FR to the master cylinder MC.

The reservoir 3 is provided in the open passage E to absorb the brake fluid pressure relieved through each outlet valve 2 when it is opened. And, a check valve 3a is provided between the reservoir 3 and the pump 4 to allow the brake fluid to flow only from the reservoir 3 to the pump 4.

The pump 4 is provided between the suction hydraulic passage C communicating with the output hydraulic passage A1 and the discharge hydraulic passage D communicating with the wheel hydraulic passage B. The pump 4 sucks the brake fluid stored in the reservoir 3, and discharges the sucked brake fluid to the discharge hydraulic passage D. As a result, while the brake fluid sucked from the reservoir 3 can be returned to the master cylinder MC, a braking force can be applied to the wheel brakes FL, RR, RL and FR by generating brake fluid pressure even when the driver does not operate the brake pedal BP.

The discharge amount of the brake fluid from the pump 4 depends on the rotation speed of the motor 9. For example, as the rotation speed of the motor 9 becomes high, the discharge amount of the brake fluid from the pump 4 increases.

The damper 5 and the orifice 5a cooperate with each other to attenuate the pulsation of the brake fluid pressure discharged from the pump 4 and to attenuate the pulsation generated by the operation of the regulator valve unit R.

In the usual state, the regulator valve unit R allows the brake fluid to flow from the output hydraulic passage A1 to the wheel hydraulic passage B. And, when the pressure on the side of the wheel cylinder H is raised by the brake fluid pressure generated by the pump 4, the regulator valve unit R adjusts the pressure on the side of the discharge hydraulic passage D, the wheel hydraulic passage B and the wheel cylinder H to a preset value or less. The regulator valve unit R includes a change-over valve 6 and a check valve 6a.

The change-over valve 6 is a normally-open linear solenoid valve provided between the output hydraulic passage A1 communicating with the master cylinder MC and the wheel hydraulic passage B communicating with each wheel brake FL/RR/RL/FR. The valve element of the change-over valve 6 is urged to the side of the wheel hydraulic passage B and the wheel cylinder H by an electromagnetic force generated depending on an applied current, and when the pressure of the wheel hydraulic passage B becomes higher than the pressure of the output hydraulic passage A1 by a predetermined value (this predetermined value depends on the applied current) or more, the brake fluid escapes from the wheel hydraulic passage B to the output hydraulic passage A1 so that the pressure on the side of the wheel hydraulic passage B is adjusted.

The check valve 6a is a one-way valve provided in parallel with each change-over valve 6. The check valve 6a allows the brake fluid to flow from the output hydraulic passage A1 to the wheel hydraulic passage B.

The suction valve 7 is a normally-closed solenoid valve provided in the suction hydraulic passage C. The suction valve 7 opens or closes the suction hydraulic passage C. When the change-over valve 6 is closed, that is, when the brake fluid pressure is applied to each wheel brake FL/RR/RL/FR while the driver does not operate the brake pedal BP, the suction valve 7 is opened by the control portion 20.

The pressure sensor 8 detects the brake fluid pressure of the output hydraulic passage A1 in the second system, and outputs the detection result to the control portion 20.

Next, the details of the control portion 20 will be described.

Figure 3:
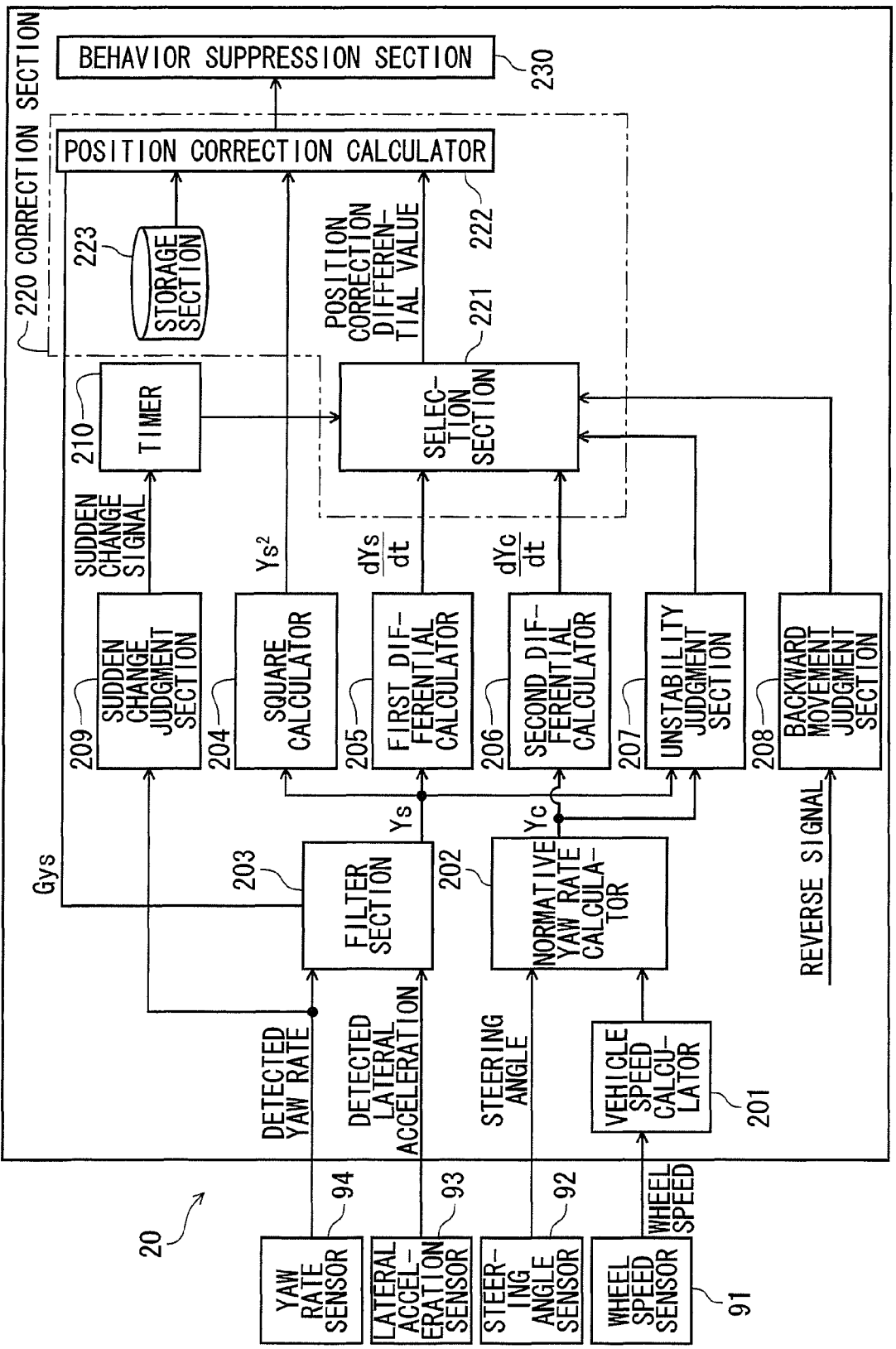
FIG. 3 illustrates a control portion of the vehicle controller.

As shown in FIG. 3, the control portion 20 controls the open/close operations of the control valve unit V, the change-over valve 6 (the regulator valve unit R) and the suction valve 7 and the operation of the motor 9 inside the hydraulic unit portion 10 based on the signals input from the sensors 91 to 94, for example, thereby controlling each wheel brake FL/RR/RL/FR. More specifically, the control portion 20 includes a vehicle speed calculator 201, a normative yaw rate calculator 202, a filter section 203, a square calculator 204, a first differential calculator 205, a second differential calculator 206, an unstability judgment section 207, a backward movement judgment section 208, a sudden change judgment section 209, a timer 210, a correction section 220 and a behavior suppression section 230.

The vehicle speed calculator 201 calculates a vehicle speed based on the wheel speed (a parameter relating to the vehicle speed) detected by each wheel speed sensor 91. The vehicle speed calculator 201 outputs the calculated vehicle speed to the normative yaw rate calculator 202.

The normative yaw rate calculator 202 calculates a normative yaw rate Yc based on the steering angle amount detected by the steering angle sensor 92 and the vehicle speed output from the vehicle speed calculator 201 according to a conventionally-known method. The normative yaw rate calculator 202 outputs the calculated normative yaw rate Yc to the second differential calculator 206 and the unstability judgment section 207.

The filter section 203 performs conventionally-known filter processing for the detected yaw rate and the detected lateral acceleration. More specifically, when the detected yaw rate and the detected lateral acceleration change steeply, the filter section 203 performs filter processing so that the amounts of change per unit time thereof are limited to predetermined upper limit values and changed mildly. Then, the filter section 203 outputs the filtered detected yaw rate Ys to the square calculator 204, the first differential calculator 205 and the unstability judgment section 207, and also outputs the filtered detected lateral acceleration Gys to the correction section 220 (a position correction calculator 222).

The square calculator 204 squares (calculates the square of) the filtered detected yaw rate Ys, and outputs the calculated squared value $Ys^2$ to the correction section 220 (the position correction calculator 222).

The first differential calculator 205 calculates the differential value dYs/dt of the filtered detected yaw rate Ys, and outputs the calculated differential value dYs/dt to the correction section 220 (a selection section 221).

The second differential calculator 206 calculates the differential value dYc/dt of the normative yaw rate Yc, and outputs the calculated differential value dYc/dt to the correction section 220 (the selection section 221).

The unstability judgment section 207 judges whether the traveling state of the vehicle is unstable according to the filtered detected yaw rate Ys and the normative yaw rate Yc. More specifically, the unstability judgment section 207 performs filter processing for the difference between the filtered detected yaw rate Ys and the normative yaw rate Yc (the deviation between the filtered detected yaw rate Ys and the normative yaw rate Yc) so as to obtain an unstable level, and compares the unstable level with a preset threshold value. When the unstable level is more than the threshold value, the unstability judgment section 207 judges that the traveling state is unstable. On the other hand, when the unstable level is equal to or less than the threshold value (the deviation is equal to or less than the predetermined value), the unstability judgment section 207 judges that the traveling state is stable and outputs a signal to the correction section 220 (the selection section 221).

In the embodiment, the unstability judgment section 207 makes the judgment at all times. Hence, the unstability judgment section 207 can make the judgment by using the detected yaw rate Ys and the normative yaw rate Yc obtained immediately before when the change rate of the detected yaw rate becomes equal to or more than the predetermined value.

The backward movement judgment section 208 judges whether the vehicle is moving backward based on a reverse signal from a reverse switch (a switch for detecting whether the transmission gear selector is in the reverse position), not shown, according to a conventionally-known method. The backward movement judgment section 208 outputs a forward movement signal to the correction section 220 (the selection section 221) only when judging that the vehicle is not moving backward. The judgment as to the backward movement is not limited to the above-mentioned method using the reverse switch. For example, a forward/backward movement acceleration sensor may be used.

The sudden change judgment section 209 judges whether the change rate (the amount of change per unit time) of the crude detected yaw rate which is detected by the yaw rate sensor 94 and not filtered is equal to or more than a predetermined value. When the change rate of the detected yaw rate is equal to or more than the predetermined value, the sudden change judgment section 209 outputs a sudden change signal.

The timer 210 sets a predetermined time corresponding to the changing time of the detected yaw rate as a counter value and decrementing this counter value gradually upon receiving the sudden change signal. The "predetermined time corresponding to the changing time of the detected yaw rate" can be set appropriately through experiments, simulations, etc. In the embodiment, as shown in FIG. 4D, a predetermined time TA is set to be longer than a time TC from when the crude detected yaw rate suddenly changes to when the filtered detected yaw rate settles.

Then, the timer 210 outputs the current counter value to the correction section 220 (the selection section 221).

The correction section 220 performs correction for making the detected lateral acceleration Gys output from the filter section 203 close to the value to be detected at the gravity center of the vehicle according to the following correction formula (1)

$$Gyc = Gys - Lx(d\gamma/dt) + Ly\cdot\gamma^2 \qquad (1)$$

where Gyc is estimated lateral acceleration, Gys is the detected lateral acceleration subjected to the filter processing, Lx is the position of the gravity center of the vehicle in the front-back direction with respect to the lateral acceleration sensor 93, Ly is the position of the gravity center of the vehicle in the left-right direction with respect to the lateral acceleration sensor 93, and $\gamma$ is a yaw rate.

Figure 5:
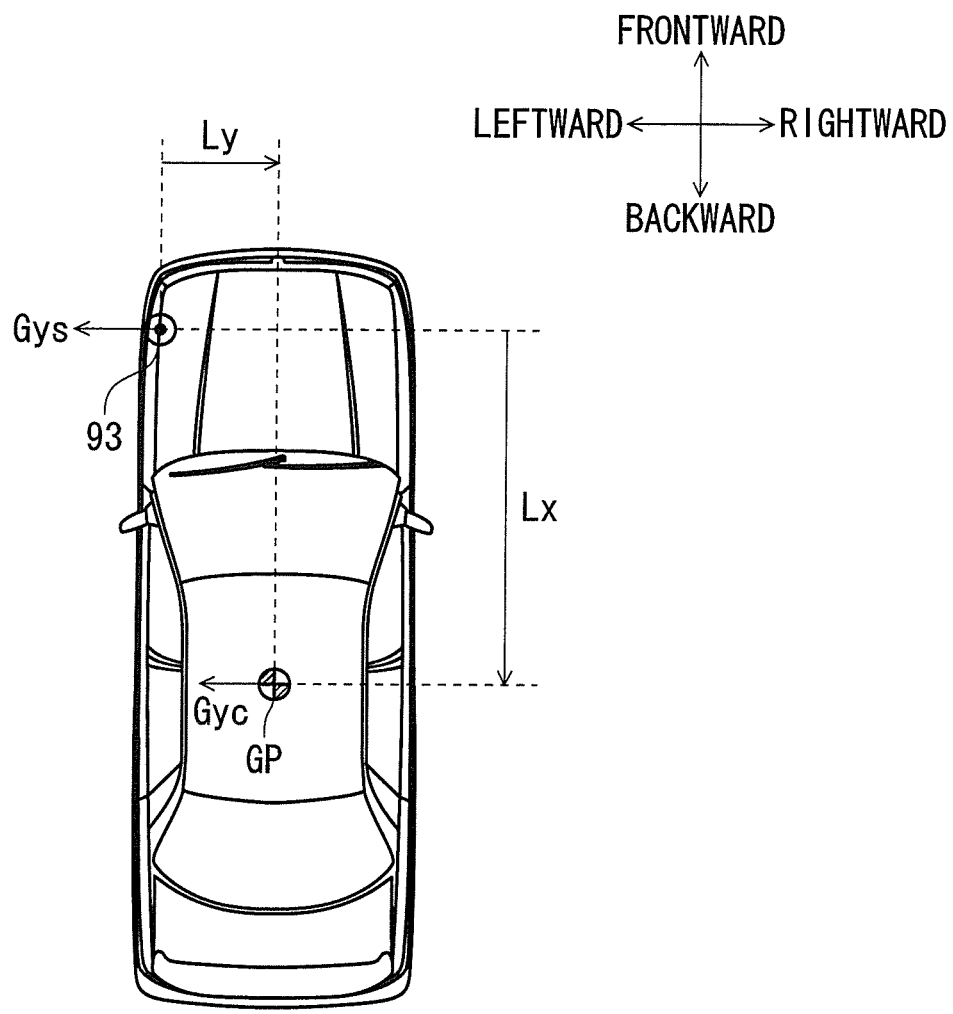
FIG. 5 illustrates the relationship between the position of the gravity center of the vehicle and the position of a lateral acceleration sensor.

As shown in FIG. 5, Lx is positive when the gravity center GP is located backward with respect to the lateral acceleration sensor 93, and the Ly is positive when the gravity center GP is located rightward with respect to the lateral acceleration sensor 93.

The correction section 220 corrects the detected lateral acceleration Gys with the detected yaw rate Ys when the sudden change judgment section 209 judges that the change rate of the crude (non-filtered) detected yaw rate is less than the predetermined value, and corrects the detected lateral acceleration with the normative yaw rate Yc instead of the detected yaw rate Ys when the sudden change judgment section 209 judges that the change rate of the crude (non-filtered) detected yaw rate is equal to or more than the predetermined value. The differential value $d\gamma/dt$ of the yaw rate in the second term "$-Lx(d\gamma/dt)$" on the right side of the correction formula (1) significantly affects the correction. The correction section 220 appropriately switches the differential value $d\gamma/dt$ of the yaw rate in the second term to a differential value dYs/dt of the detected yaw rate or a differential value dYc/dt of the normative yaw rate.

On the other hand, the third term "$Ly\cdot\gamma^2$" on the right side of the above-mentioned correction formula (1) may not significantly affect the correction. Hence, in the embodiment, the detected yaw rate Ys is used for the yaw rate $\gamma$ in the third term, without being switched to the normative yaw rate Yc. Of course, the yaw rate $\gamma$ in the third time may also be switched to the normative yaw rate Yc, similarly to the second term.

The correction section 220 includes the selection section 221, the position correction calculator 222 and a storage section 223. The above-mentioned correction formula (1) is stored in the storage section 223.

The selection section 221 makes a selection as to whether the differential value dYs/dt of the detected yaw rate Ys or the differential value dYc/dt of the normative yaw rate Yc is used as a differential value (position correction differential value) for position correction based on the counter value output from the timer 210.

When the counter value is 0, the selection section 221 selects the differential value dYs/dt of the detected yaw rate Ys and outputs the differential value to the position correction calculator 222 as the position correction differential value. On the other hand, when the counter value is not 0, the selection section 221 selects the differential value dYc/dt of the normative yaw rate Yc and outputs the differential value to the position correction calculator 222 as the position correction differential value.

Figure 4A:
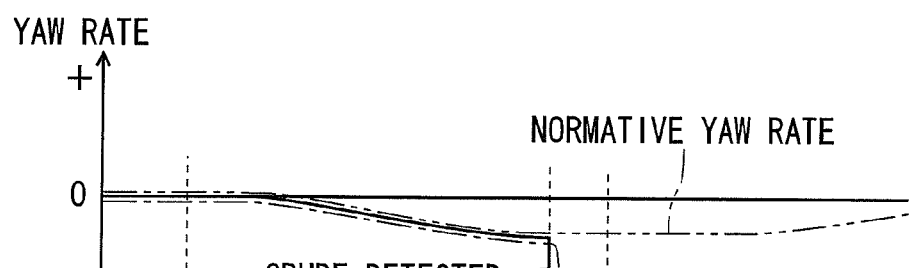
FIGS. 4A to 4D are time charts at the time when the detected yaw rate changes suddenly, FIG. 4A illustrating the yaw rate, FIG. 4B illustrating the lateral acceleration, FIG. 4C illustrating the differential value of the yaw rate, FIG. 4D illustrating the value of a timer.
Figure 4B:
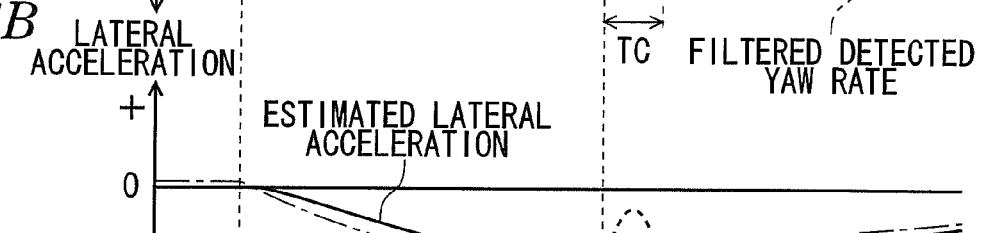
Figure 4C:
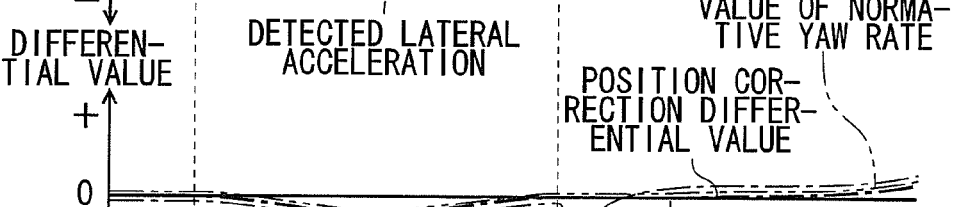
Figure 4D:
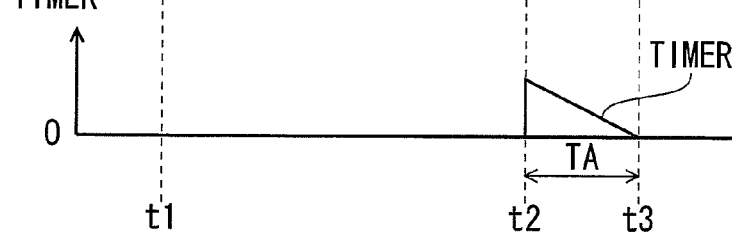

In other words, as shown in FIGS. 4A and 4D, the correction section 220 performs correction using the normative yaw rate only during the predetermined time TA (counter value) corresponding to the changing time TC of the detected yaw rate and to resume correction using the detected yaw rate after the predetermined time TA.

The selection section 221 sets the counter value to 0 when no signal is received from the unstability judgment section 207. Hence, when no signal is received from the unstability judgment section 207, the selection section 221 selects the differential value dYs/dt of the detected yaw rate Ys and outputs the differential value to the position correction calculator 222 as the position correction differential value.

In other words, the correction section 220 performs correction using the normative yaw rate only when the traveling state of the vehicle is not unstable.

The selection section 221 also sets the counter value to 0 when the forward movement signal is not received. Hence, when the forward movement signal is not received, the selection section 221 selects the differential value dYs/dt of the detected yaw rate Ys and outputs the differential value to the position correction calculator 222 as the position correction differential value.

Further, the selection section 221 subjects the selected differential value to conventionally-known filter processing (filter processing for suppressing the change of a value), thereby preventing sudden change in the difference between the former differential value and the current differential value.

The position correction calculator 222 calculates the estimated lateral acceleration Gyc by correcting the detected lateral acceleration Gys output from the filter section 203 based on the squared value $Ys^2$ of the detected yaw rate output from the square calculator 204, the position correction differential value selected by the selection section 221 and the correction formula (1) read from the storage section 223. The position correction calculator 222 outputs the calculated estimated lateral acceleration Gyc to the behavior suppression section 230.

The behavior suppression section 230 is configured to perform conventionally-known vehicle behavior control for suppressing the behavior of the vehicle using the detected lateral acceleration corrected by the correction section 220 (that is, the estimated lateral acceleration Gyc). More specifically, the behavior suppression section 230 calculates the moment for stabilizing the vehicle using the deviation between the detected yaw rate and the normative yaw rate and then calculates the brake pressure to be generated at the caliper of the brake. On this occasion, the limit value for the moment is set based on lateral acceleration.

For example, if a large moment is obtained by the calculation on a low μ road (a low-friction-coefficient road surface), the brake pressure to be generated at the caliper rises, and the wheel will likely lock. Hence, the moment is limited based on the lateral acceleration to prevent the wheel from locking.

Furthermore, the behavior suppression section 230 limits the moment to suppress improper behavior control by referring to the lateral acceleration even if the detected yaw rate changes abnormally. When the behavior suppression section 230 performs behavior control with the lateral acceleration sensor disposed at the gravity center, improper behavior control can be suppressed using the lateral acceleration. On the other hand, when behavior control is performed with the lateral acceleration sensor disposed not at the gravity center and correction for making the detected lateral acceleration close to a value to be detected at the gravity center is performed using the detected yaw rate, if the detected yaw rate changes abnormally, the lateral acceleration is affected thereby and changes. In this embodiment, even if the yaw rate sensor is abnormal, the value of the lateral acceleration after the correction can be prevented from changing, thereby suppressing improper behavior control.

Next, the operation of the control portion 20 will be described referring to FIG. 6.

Figure 6:
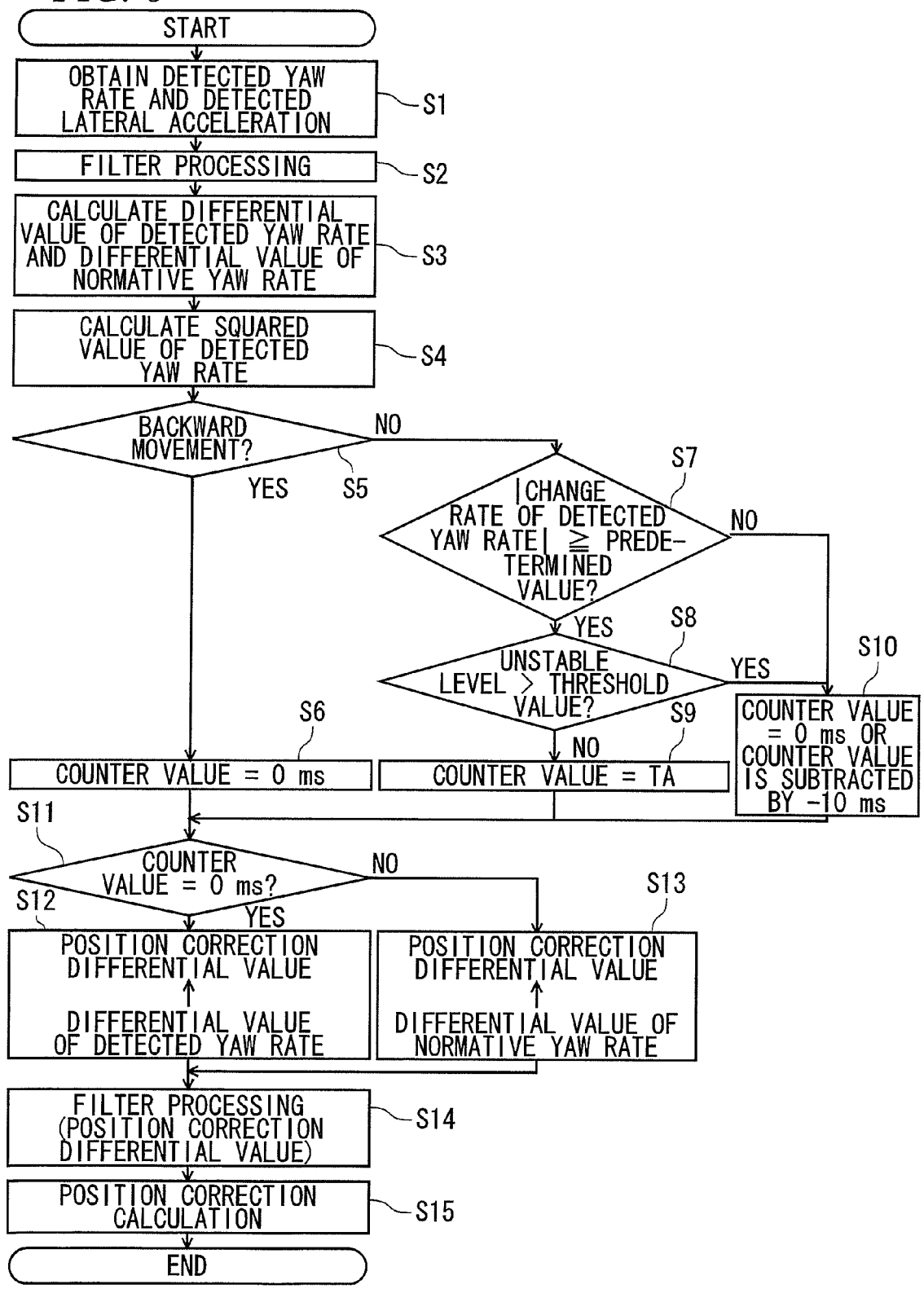
FIG. 6 illustrates an operation of the control portion.

As shown in FIG. 6, the control portion 20 first obtains the detected yaw rate and the detected lateral acceleration from the sensors 93 and 94 (at step S1), and the obtained data are respectively subjected to filter processing (at step S2). After step S2, the control portion 20 calculates the differential value dYs/dt of the detected yaw rate and the differential value dYc/dt of the normative yaw rate (at step S3) and then calculates the squared value $Ys^2$ of the detected yaw rate (at step S4).

After step S4, the control portion 20 judges whether the vehicle is moving backward (at step S5). When the control portion 20 judges that the vehicle is moving backward (Yes at step S5), the control portion 20 sets the counter value to zero (at step S6).

When the control portion 20 judges that the vehicle is not moving backward (No at step S5), the control portion 20 judges whether the change rate of the detected yaw rate is equal to or more than the predetermined value, that is, whether the detected yaw rate has changed suddenly (at step S7). When the control portion 20 judges that the detected yaw rate has changed suddenly (Yes at step S7), the control portion 20 judges whether the unstable level is more than the threshold value (at step S8).

When the unstable level is equal to or less than the threshold value (NO at step S8), the control portion 20 sets the counter value to the predetermined time TA (at step S9). When the result of the judgment is No at step S7 or when the result of the judgment is Yes at step S8, the control portion 20 subtracts the counter value by 10 ms unless the counter value is zero (at step S10). When the counter value is zero, the control portion 20 holds the counter value to be zero.

After steps S6, S9 and S10, the control portion 20 judges whether the counter value is zero (at step S11). When the counter value is zero (YES at step S11), the control portion 20 selects the differential value dYs/dt of the detected yaw rate as the position correction differential value (at step S12).

When the counter value is not zero (NO at step S11), the control portion 20 selects the differential value dYc/dt of the normative yaw rate as the position correction differential value (at step S13). After step S12 or step S13, the control portion 20 subjects the selected differential value to the conventionally-known filter processing (at step S14), and subjects the detected lateral acceleration Gys to position correction using the differential value, the squared value of the detected yaw rate and the correction formula (1) to calculate the estimated lateral acceleration Gyc (at step S15).

Next, a case where the position correction according to the embodiment is performed and a case where the correction is not performed will be compared referring to FIGS. 4A to 4D. It is assumed that the position correction is performed while the detection value of the yaw rate sensor 94 changes suddenly (the detection value is offset with respect to its normal output) due to the abnormality of the yaw rate sensor 94. In FIGS. 4A to 4D, for the sake of convenience, the lines indicating the detected yaw rate, the normative yaw rate etc. are displaced from each other so that the difference therebetween can be observed. However, in reality, the portions of the respective lines being close to and in parallel with each other have approximately the same value.

When the vehicle smoothly turns from its straight traveling state (at time t1), the crude (non-filtered) detected yaw rate, the filtered detected yaw rate, the normative yaw rate, the detected lateral acceleration and the estimated lateral acceleration change smoothly together (from time t1 to time t2) as shown in FIGS. 4A and 4B. Furthermore, as shown in FIG. 4C, the differential value of the detected yaw rate and the differential value of the normative yaw rate continue to have an approximately constant value.

As long as the crude (non-filtered) detected yaw rate does not change suddenly, the differential value of the detected yaw rate is selected as the position correction differential value as shown in FIG. 4C (see the thick alternate long and short dash line).

When the crude (non-filtered) detected yaw rate changes suddenly at time t2 as shown in FIG. 4A due to the abnormality of the yaw rate sensor 94, the differential value of the detected yaw rate shown in FIG. 4C also changes suddenly. In a comparison example in which the position correction according to the embodiment is not performed, the estimated lateral acceleration changes suddenly as indicated by the broken line shown in FIG. 4B depending on the differential value of the detected yaw rate that changes suddenly, thereby deviating significantly from the detected lateral acceleration.

On the other hand, in the embodiment, when the above-mentioned sudden change occurs, the position correction is performed using the normative yaw rate that is not affected by the crude detected yaw rate (see the thin alternate long and two short dashes line). In other words, when the crude detected yaw rate changes suddenly, the counter value of the timer shown in FIG. 4D is set to the predetermined value TA, and the normative yaw rate is selected as the position correction differential value shown in FIG. 4C until the counter value becomes zero. As a result, the estimated lateral acceleration is prevented from deviating significantly from the detected lateral acceleration as indicated by the solid line shown in FIG. 4B.

After the counter value becomes zero (at time t3), the differential value of the detected yaw rate is selected as the position correction differential value shown in FIG. 4C (see the thick alternate long and short dash line). At this time, even if the differential value of the normative yaw rate deviates from the differential value of the detected yaw rate, the differential value of the normative yaw rate changes smoothly to the differential value of the detected yaw rate by virtue of the conventionally-known filter processing.

Accordingly, the following advantages can be obtained in the embodiment.

When the change rate of the crude detected yaw rate is equal to or more than the predetermined value, the detected lateral acceleration Gys is corrected with the normative yaw rate Yc. Hence, even when the detected yaw rate changes suddenly, the detected lateral acceleration Gys can be corrected appropriately without being affected by this sudden change. Furthermore, when the change rate of the crude detected yaw rate is less than the predetermined value, the detected lateral acceleration Gys can be corrected accurately based on the filtered detected yaw rate which corresponds to the crude detected raw rate. In other words, both the accurate correction and a fail-safe state free from the influence caused due to the abnormality of the yaw rate sensor can be accomplished in the present invention by virtue of the switching of the control using a simple method.

Since the normative yaw rate Yc is calculated from the steering angle amount and the vehicle speed, the normative yaw rate Yc can be made closer to the measurement value (the crude detected raw rate), and the correction at the time of the fail-safe state can be performed more accurately.

Since the normative yaw rate Yc is used only in a period in which the correction value is most affected by the sudden change of the detected yaw rate, the lateral acceleration can be corrected so as not to be affected by the sudden change as much as possible. Moreover, when the sudden change of the output value of the yaw rate sensor is merely temporarily, accurate correction can be performed using the detected yaw rate Ys again.

Since the normative yaw rate Yc is used only when the traveling state of the vehicle is not unstable, the correction using the normative yaw rate Yc can be performed accurately.

Since the unstability judgment section judges whether the traveling state of the vehicle is unstable using the detected yaw rate and the steering angle amount immediately before the sudden change of the detected yaw rate, the judgment section can accurately judge the traveling state (the unstable level) of the vehicle immediately before the yaw rate sensor is suspected as being abnormal.

Even when the detected yaw rate changes suddenly due to the abnormality of the yaw rate sensor 94, the behavior of the vehicle can be suppressed properly by correcting the detected lateral acceleration Gys based on the normative yaw rate Yc. In addition, when the change rate of the detected yaw rate is less than the predetermined value, the detected lateral acceleration Gys is accurately corrected using the filtered detected yaw rate Ys which corresponds to the crude detected raw rate. Hence, the behavior of the vehicle can be suppressed properly based on the accurate correction value.

The present invention is not limited to the above-mentioned embodiment but can be applied to various embodiments exemplified below.

In the above-mentioned embodiment, the lateral acceleration sensor 93 is disposed forwardly of the gravity center of the vehicle. However, the present invention is not limited to this disposition, but the sensor may be disposed behind the position of the gravity center.

In the above-mentioned embodiment, the normative yaw rate is calculated based on the steering angle amount and the vehicle speed. However, the present invention is not limited to this calculation method, but the normative yaw rate may be calculated based on the steering angle amount and the wheel speed, for example.

In the above-mentioned embodiment, the vehicle speed is calculated based on the wheel speed. However, the present invention is not limited to this calculation method, but the vehicle speed may be calculated based on the forward/backward movement acceleration values detected by the forward/backward movement acceleration sensors, for example.

In the above-mentioned embodiment, the judgment as to whether the traveling state of the vehicle is unstable is made based on the deviation between the detected yaw rate and the normative yaw rate. However, the present invention is not limited to this judgment method, but the judgment as to whether the traveling state of the vehicle is unstable may be made using the change rates respectively obtained by differentiating the detected yaw rate and the normative yaw rate. Furthermore, the judgment as to whether the traveling state is unstable may be made based on the slip ratio calculated from the vehicle speed and the wheel speed on the rear side (on the driven wheel side).

The invention claimed is:

1. A vehicle controller comprising:
a sudden change judgment section that judges whether a change rate of a detected yaw rate detected by a yaw rate sensor is equal to or more than a predetermined value;
a normative yaw rate calculator that calculates a normative yaw rate based on a steering angle amount detected by a steering angle sensor; and
a correction section that performs a correction for making a detected lateral acceleration detected by a lateral acceleration sensor close to a value to be detected at a gravity center of a vehicle, the lateral acceleration sensor being positioned not at the gravity center, the correction being performed by using:
the detected yaw rate when the sudden change judgment section judges that the change rate of the detected yaw rate is less than the predetermined value;
the normative yaw rate instead of the detected yaw rate when the sudden change judgment section judges that the change rate of the detected yaw rate is equal to or more than the predetermined value; and
an unstability judgment section that judges that a traveling state of the vehicle is unstable according to a filtered detected yaw rate and the normative yaw rate based on the steering angle amount detected by the steering angle sensor.

2. The vehicle controller of claim 1, further comprising:
a vehicle speed calculator that calculates the vehicle speed based on a parameter relating to the vehicle speed,
wherein the normative yaw rate calculator calculates the normative yaw rate based on the steering angle amount and the vehicle speed.

3. The vehicle controller of claim 1,
wherein the correction section performs the correction using the normative yaw rate only during a predetermined time and resumes the correction using the detected yaw rate after the predetermined time is elapsed, the predetermined time corresponding to a changing time of the detected yaw rate.

4. The vehicle controller of claim 1,
wherein the unstability judgment section that judges that a traveling state of the vehicle is unstable when a unstable level is more than a threshold value, the unstable level indicating an unstableness of the traveling state of the vehicle,
wherein the correction section performs the correction using the normative yaw rate only when the unstability judgment section does not judge the traveling state of the vehicle to be unstable.

5. The vehicle controller of claim 4,
wherein the unstability judgment section makes the judgment by using at least the detected yaw rate and the steering angle amount immediately before when the change rate of the detected yaw rate becomes equal to or more than the predetermined value.

6. The vehicle controller of claim 1, wherein
the vehicle controller is capable of performing a vehicle behavior control to suppress a behavior of the vehicle using the detected lateral acceleration subjected to the correction by the correction section.

7. The vehicle controller of claim 1, wherein the unstability judgment section performs filter processing for a difference between the filtered detected yaw rate and the normative yaw rate so as to obtain an unstable level, and compares the unstable level with a preset threshold value.

8. The vehicle controller of claim 7,
wherein when the unstable level is more than the threshold value, the unstability judgment section judges that a traveling state is unstable, and
wherein when the unstable level is equal to or less than the threshold value, the unstability judgment section judges that the traveling state is stable and outputs a signal to the correction section.

9. The vehicle controller of claim 8, wherein the unstability judgment makes the judgment at all times by using the detected yaw rate and the normative yaw rate obtained immediately before when a change rate of the detected yaw rate becomes equal to or more than the predetermined value.

10. The vehicle controller of claim 3,
wherein the sudden change judgment section judges whether a change rate of a crude detected yaw rate which is detected by the yaw rate sensor and not filtered is equal to or more than the predetermined value, and
wherein when the change rate of the detected yaw rate is equal to or more than the predetermined value, the sudden change judgment section outputs a sudden change signal.

11. The vehicle controller of claim 10,
wherein a timer sets a predetermined time corresponding to the changing time of the detected yaw rate as a counter value and decrements the counter value gradually upon receiving a sudden change signal,
wherein the timer outputs the current counter value to the correction section, and
wherein the correction section performs correction for making a detected lateral acceleration output from a filter section close to the value to be detected at the gravity center of the vehicle according to the following correction formula (1)

$$Gyc = Gys - Lx(d\gamma/dt) + Ly\gamma^2 \qquad (1),$$

where Gyc is estimated lateral acceleration,
Gys is a detected lateral acceleration subjected to filter processing,
Lx is a position of the gravity center of the vehicle in a front-back direction with respect to the lateral acceleration sensor,
Ly is the position of the gravity center of the vehicle in the left-right direction with respect to the lateral acceleration sensor, and
$\gamma$ is a yaw rate, and
wherein Lx is positive when the gravity center GP is located backward with respect to the lateral acceleration sensor, and the Ly is positive when the gravity center GP is located rightward with respect to the lateral acceleration sensor.

12. The vehicle controller of claim 11,
wherein the correction section corrects the detected lateral acceleration Gys with the detected yaw rate when the sudden change judgment section judges that the change rate of a crude (non-filtered) detected yaw rate is less than the predetermined value, and corrects the detected lateral acceleration with the normative yaw rate instead of the detected yaw rate when the sudden change judgment section judges that the change rate of the crude (non-filtered) detected yaw rate is equal to or more than the predetermined value.

13. The vehicle controller of claim 12,
wherein the correction section switches the differential value $d\gamma/dt$ of the yaw rate in the second term to a differential value of the detected yaw rate or a differential value of the normative yaw rate.

14. The vehicle controller of claim 4,
wherein the correction section includes a selection section, a position correction calculator and a storage section.

15. The vehicle controller of claim 14,
wherein the selection section makes a selection as to whether a differential value of the detected yaw rate or a differential value of the normative yaw rate is used as a differential value for position correction based on a counter value output from a timer.

16. The vehicle controller of claim 14,
wherein the position correction calculator calculates an estimated lateral acceleration by correcting a detected lateral acceleration output from a filter section based on a squared value of the detected yaw rate output from a square calculator.

17. A vehicle controller comprising:
a sudden change judgment section that judges whether a change rate of a detected yaw rate detected by a yaw rate sensor is equal to or more than a predetermined value;
a normative yaw rate calculator that calculates a normative yaw rate based on a steering angle amount detected by a steering angle sensor; and
a correction section that performs a correction for making a detected lateral acceleration detected by a lateral acceleration sensor close to a value to be detected at a gravity center of a vehicle, the lateral acceleration sensor being positioned not at the gravity center, the correction being performed by using:
the detected yaw rate when the sudden change judgment section judges that the change rate of the detected yaw rate is less than the predetermined value; and
the normative yaw rate instead of the detected yaw rate when the sudden change judgment section judges that the change rate of the detected yaw rate is equal to or more than the predetermined value,
an unstability judgment section that judges that a traveling state of the vehicle is unstable when a unstable level is more than a threshold value, the unstable level indicating an unstableness of the traveling state of the vehicle,
wherein the correction section performs the correction using the normative yaw rate only when the unstability judgment section does not judge the traveling state of the vehicle to be unstable,
wherein the correction section includes a selection section, a position correction calculator and a storage section,
wherein the selection section makes a selection as to whether a differential value of the detected yaw rate or a differential value of the normative yaw rate is used as a differential value for position correction based on a counter value output from a timer,
wherein when no signal is received from the unstability judgment section, the selection section selects the differential value of the detected yaw rate and outputs the differential value to the position correction calculator as the position correction differential value.

18. The vehicle controller of claim 17,
wherein the selection section sets the counter value to 0 when a forward movement signal is not received and hence selects the differential value of the detected yaw rate and outputs the differential value to the position correction calculator as the position correction differential value.

19. The vehicle controller of claim 18,
wherein the selection section subjects the selected differential value to a filter processing to prevent sudden change in the difference between a former differential value and a current differential value.

* * * * *